(12) United States Patent
Chen

(10) Patent No.: US 8,561,625 B2
(45) Date of Patent: Oct. 22, 2013

(54) SUN-TRACING SUNSHADE APPARATUS

(76) Inventor: Xing-Han Chen, Taichung (TW)

( * ) Notice: Subject to any disclaimer, the term of this patent is extended or adjusted under 35 U.S.C. 154(b) by 252 days.

(21) Appl. No.: 13/110,699

(22) Filed: May 18, 2011

(65) Prior Publication Data

US 2012/0097202 A1    Apr. 26, 2012

(30) Foreign Application Priority Data

Oct. 22, 2010    (TW) .............................. 99220437 U

(51) Int. Cl.
*A45B 25/02*    (2006.01)

(52) U.S. Cl.
USPC .............................. 135/20.3; 135/15.1; 135/16

(58) Field of Classification Search
USPC .................................. 135/15.1, 16; 160/1, 5, 7
See application file for complete search history.

(56) References Cited

U.S. PATENT DOCUMENTS

| | | | | |
|---|---|---|---|---|
| 7,128,076 B2 * | 10/2006 | Freedman | ..................... | 135/20.3 |
| 7,407,178 B2 * | 8/2008 | Freedman | ..................... | 280/642 |
| 7,631,653 B2 * | 12/2009 | Young et al. | .................. | 135/15.1 |
| 7,779,849 B2 * | 8/2010 | Labarbera | ....................... | 135/16 |
| 7,926,496 B2 * | 4/2011 | Young et al. | ..................... | 135/16 |
| 7,926,497 B2 * | 4/2011 | Young et al. | .................. | 135/20.1 |
| 8,104,491 B2 * | 1/2012 | Li | ................................... | 135/16 |
| 8,291,923 B2 * | 10/2012 | Young et al. | .................. | 135/20.1 |
| 2011/0192434 A1 * | 8/2011 | Young et al. | ................. | 135/20.1 |
| 2012/0273016 A1 * | 11/2012 | Pandak | ........................... | 135/16 |

* cited by examiner

*Primary Examiner* — David Dunn
*Assistant Examiner* — Danielle Jackson
(74) *Attorney, Agent, or Firm* — Muncy, Geissler, Olds & Lowe, PLLC

(57) ABSTRACT

A sun-tracing sunshade apparatus includes a support, a first top shade member rotatably mounted on the support, a lateral shade member pivotally coupled to the first top shade member, a drive unit installed in the support and adapted for rotating the first top shade member relative to the support, a sun tracker electrically coupled with the drive unit and adapted for sensing the direction of the sun and providing a corresponding signal to the drive unit, and a push member mounted on the support and movable to touch the lateral shade member and to further bias the lateral shade member relative to the first top shade member. Thus, the first top shade member can be turned subject to the direction of sunlight to move the lateral shade member to the optimal shading position, providing excellent sun-shading effect. Further, when the lateral shade member is moved to the front side of the user, it can be lifted by the push member, avoiding hindering the user's sight.

10 Claims, 9 Drawing Sheets

SUN-TRACING SUNSHADE APPARATUS

BACKGROUND OF THE INVENTION

1. Field of the Invention

The present invention relates to an apparatus for sunlight protection and more particularly, to a sun-tracing sunshade, which automatically changes its shading position subject to the angle of the light rays of the sun.

2. Description of the Related Art

A conventional sunshade apparatus is known comprising a support and a canopy arranged at the top side of the support. The support can be affixed to an object, for example, a leisure table or the ground. The support can also be fastened to a vehicle, for example, bicycle, electrical motorcycle or wheelchair. The canopy is disposed right above the user to keep the user from the light of the sun. However, because sunlight passes from lateral side in most of the time, it is obvious that the sun-shading effect of the aforesaid sun-shade apparatus is not well.

There are commercial sunshade apparatuses capable of shading lateral sunlight. These sunshade apparatuses commonly have a lateral shade member suspending from the outer edge of the canopy. However, in order to avoid hindering the user's sight, the length of the lateral shade member is limited, lowering its sun-shading effect.

In general, the aforesaid prior art sunshade designs are not satisfactory in function and have room for improvement.

SUMMARY OF THE INVENTION

The present invention has been accomplished under the circumstances in view. It is the main object of the present invention to provide a sun-tracing sunshade apparatus, which automatically adjusts its shading position subject to the direction of the light of the sun, providing excellent sun-shading effect without hindering the user's sight.

To achieve this and other objects of the present invention, a sun-tracing sunshade apparatus includes a support, a first top shade member rotatably mounted on the support, a lateral shade member pivotally coupled to the first top shade member, a drive unit installed in the support and adapted for rotating the first top shade member relative to the support, a sun tracker electrically coupled with the drive unit and adapted for sensing the direction of the sun and providing a corresponding signal to the drive unit, and a push member mounted on the support and movable to touch the lateral shade member and to further bias the lateral shade member relative to the first top shade member.

Thus, the sun tracker senses the direction of the light of the sun and provides a corresponding signal to the drive unit, causing the drive unit to rotate the first top shade member and the lateral shade member to the optimal shading position to effectively shade the user from the light of the sun, i.e., the lateral shade member simply shades the user from the light of the sun without shielding other area round the user. Further, subject to the use of the push member to lift the lateral shade member, the lateral shade member does not block the user's sight when it is kept in front of the user to effectively protect the user against the light of the sun.

Other advantages and features of the present invention will be fully understood by reference to the following specification in conjunction with the accompanying drawings, in which like reference signs denote like components of structure.

DETAILED DESCRIPTION OF THE INVENTION

Figure 1:
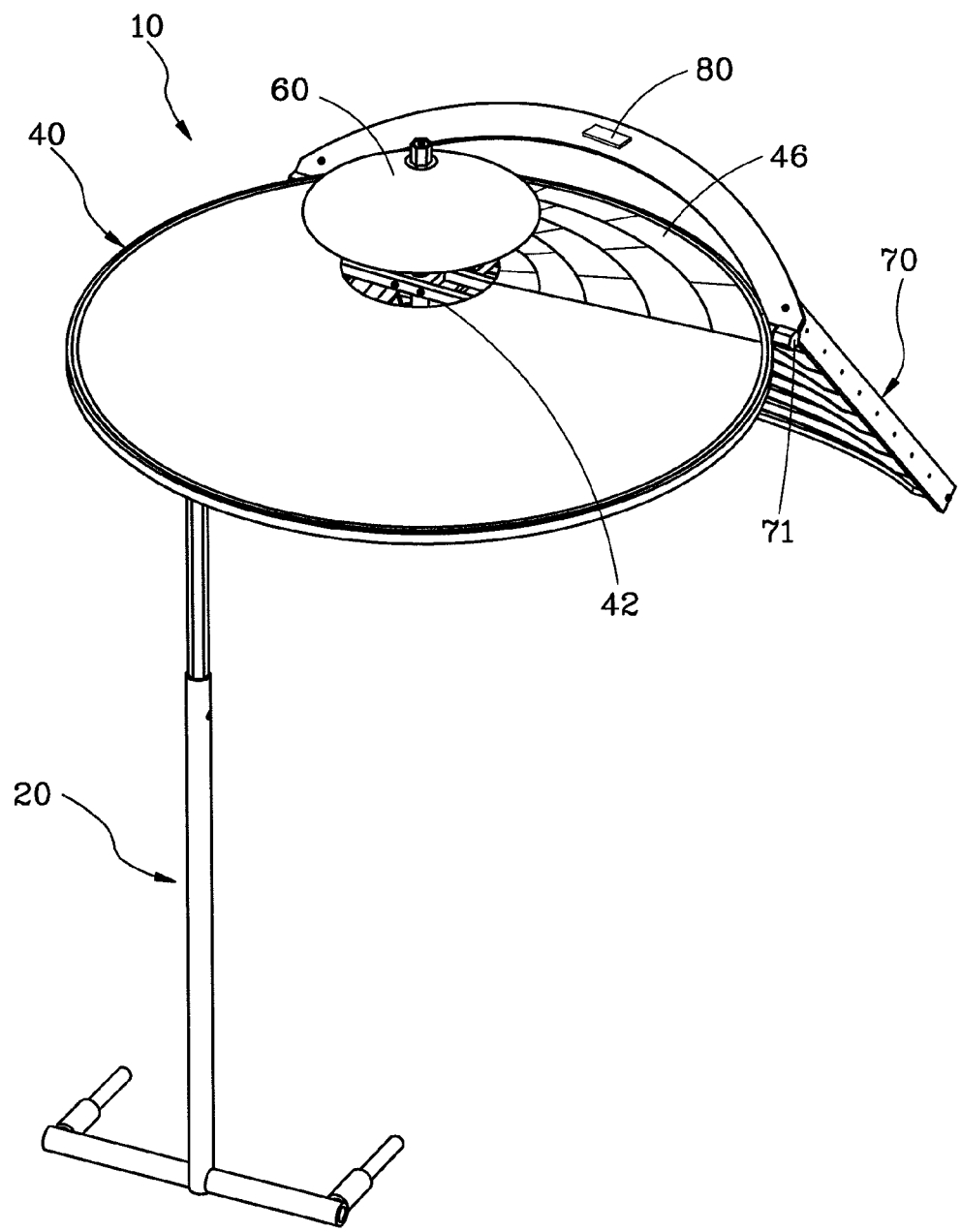
FIG. 1 is an oblique top elevational view of a sun-tracing sunshade in accordance with the present invention.
Figure 2:
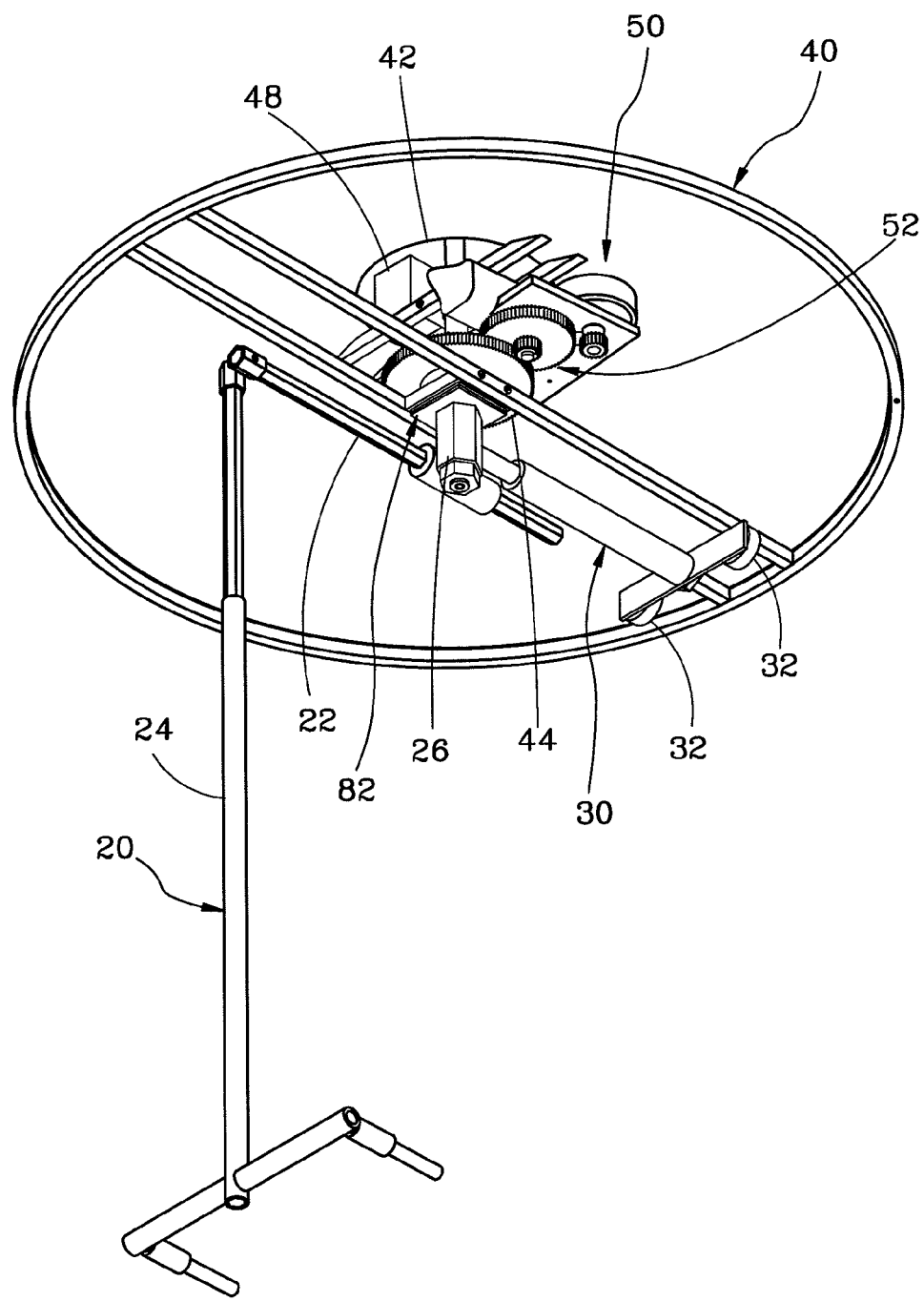
FIG. 2 is an oblique bottom elevational view of the sun-tracing sunshade in accordance with the present invention after removal of the lateral shade member.
Figure 3:
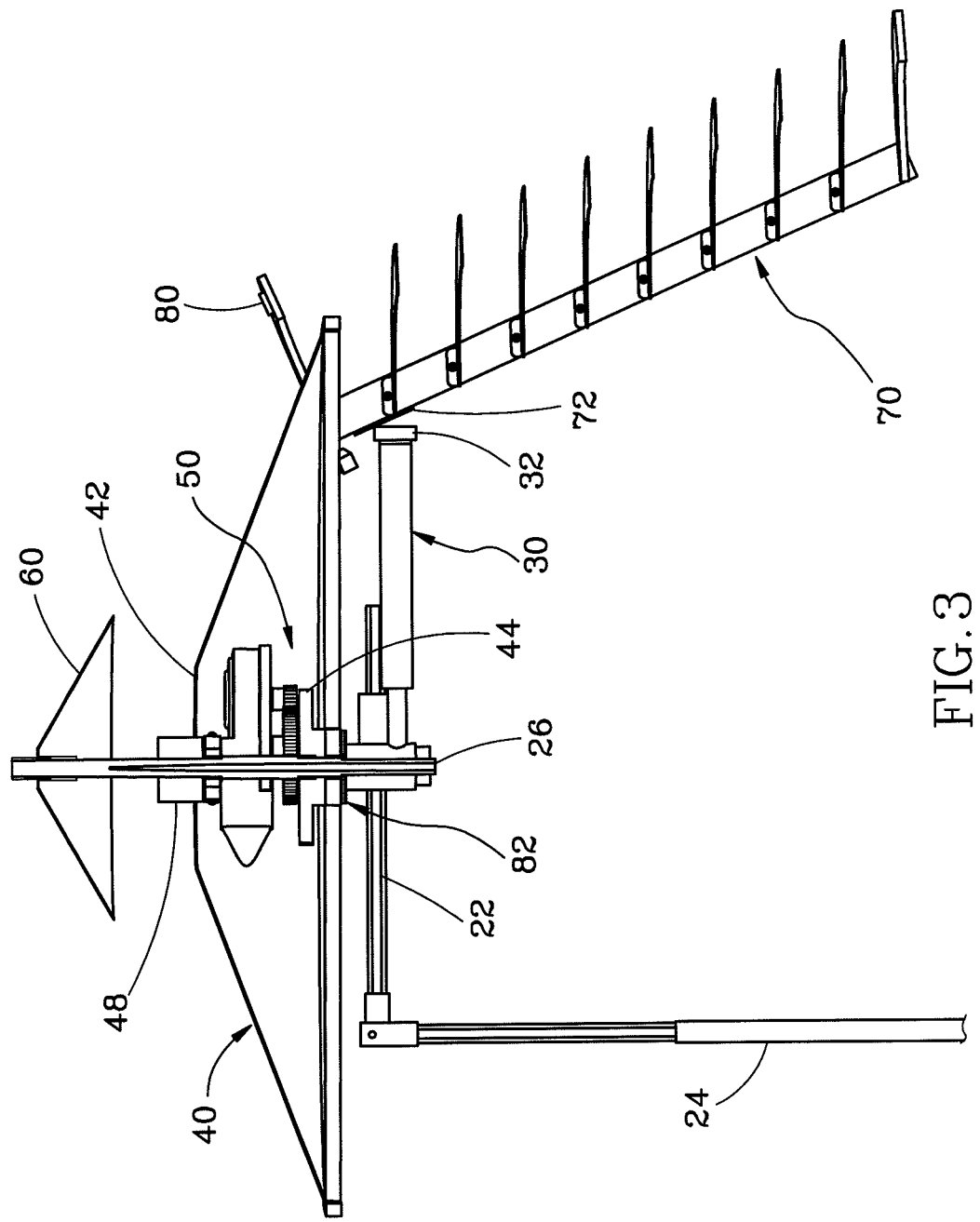
FIG. 3 is a sectional side view of the sun-tracing sunshade in accordance with the present invention, illustrating the lateral shade member disposed at a front side relative to the support.
Figure 4:
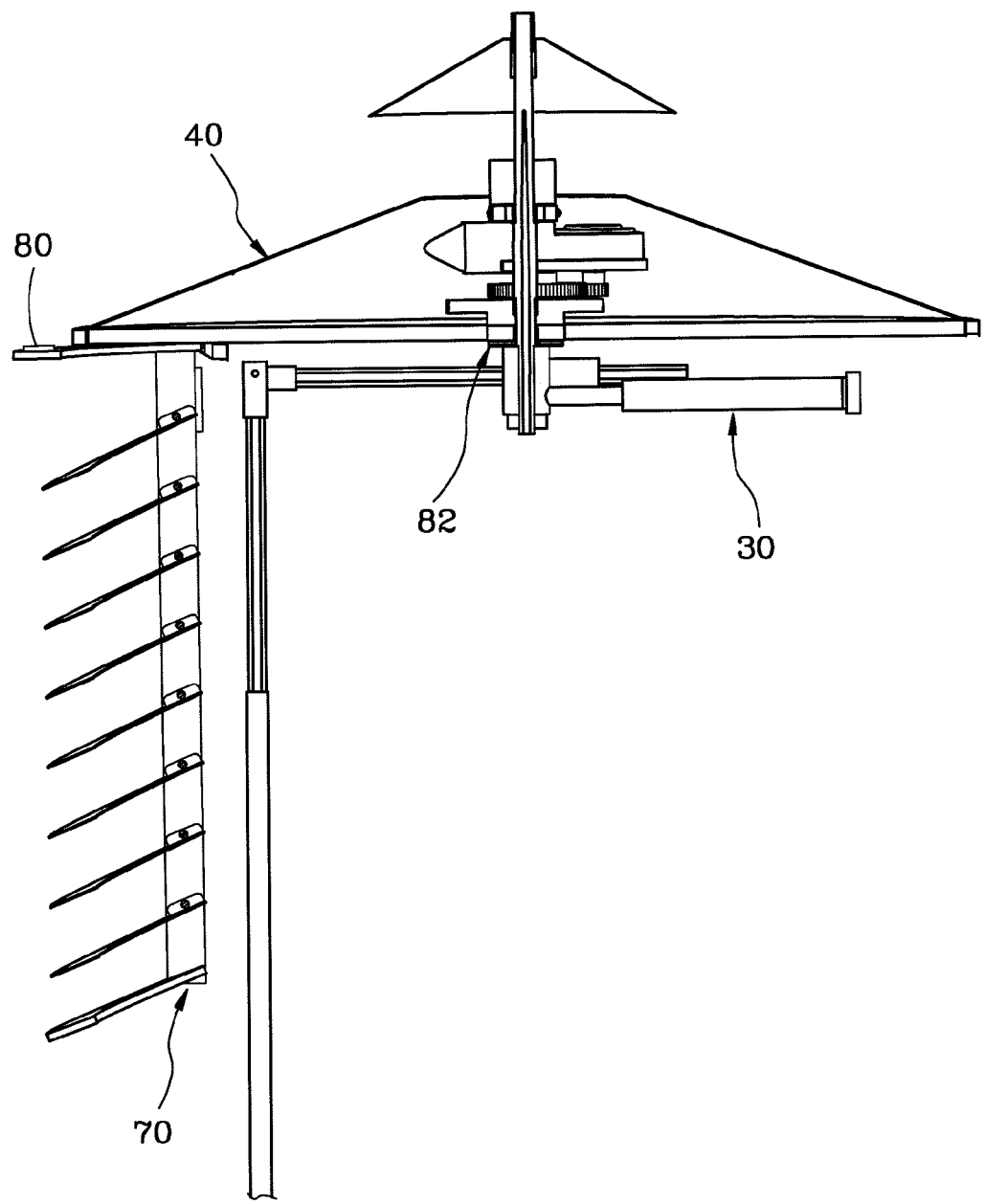
FIG. 4 is similar to FIG. 3 but illustrating the lateral shade member disposed at a rear side relative to the support.

Referring to FIGS. 1-4, a sun-tracing sunshade 10 in accordance with the present invention is shown comprising a support 20, a push member 30, a first top shade member 40, a drive unit 50, a second top shade member 60, a lateral shade member 70 and a sun tracker 80.

The support 20 comprises a transverse bar 22, a first vertical bar 24 connected to one end, namely, the rear end of the transverse bar 22 and extending vertically downwards, and a second vertical rod 26 connected to the transverse bar 22 and extending vertically upwards.

Figure 5:
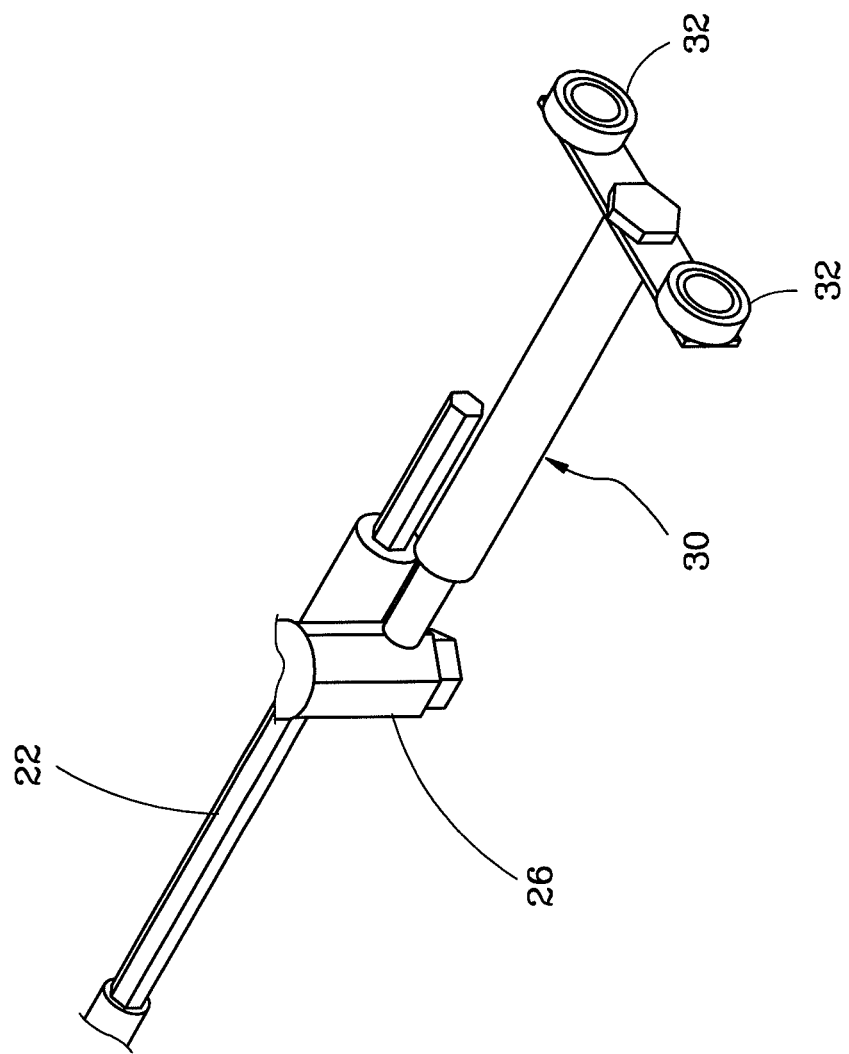
FIG. 5 is an elevational view of a part of the sun-tracing sunshade in accordance with the present invention, illustrating the push member connected to the second vertical rod of the support.
Figure 6:
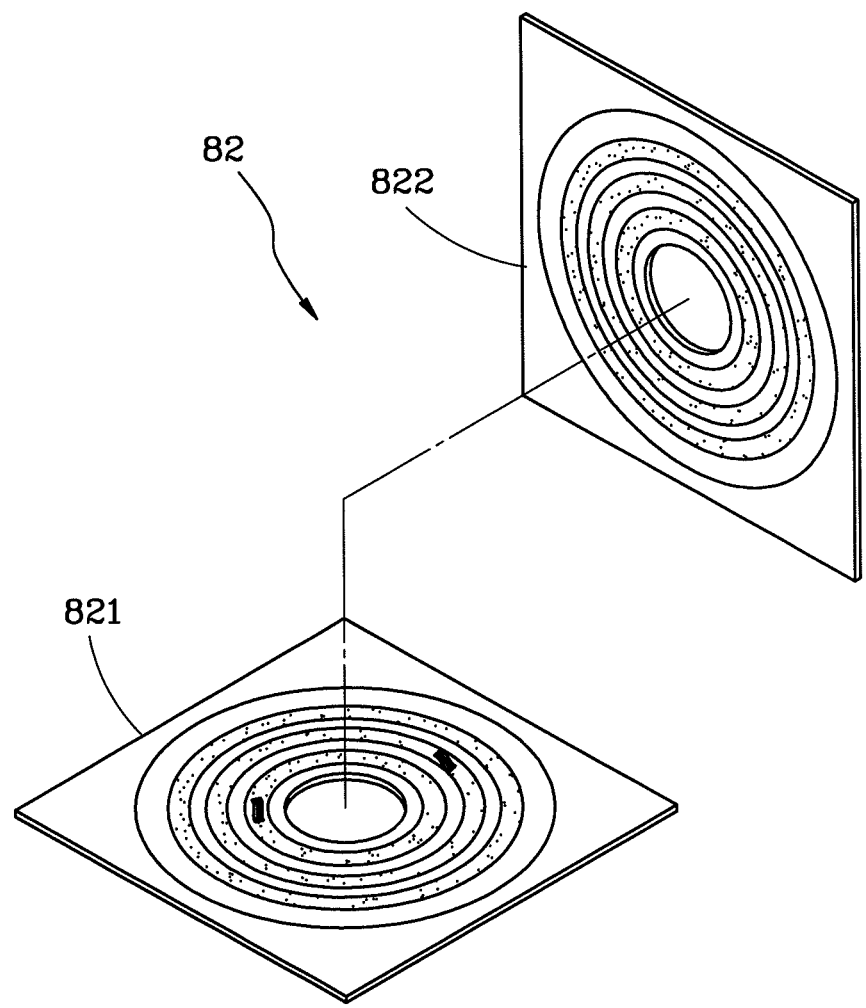
FIG. 6 is an exploded view of the rotary connection unit of the sun-tracing sunshade in accordance with the present invention.

The push member 30 is a reciprocating device having its one end connected to the second vertical rod 26, and its other end facing toward the front side of the transverse bar 22 and mounted with two rollers 32 (see FIG. 5).

The first top shade member 40 is shaped like an umbrella and rotatably mounted on the second vertical rod 26 above the push member 30, having a top opening 42 at the center of the top side thereof for the passing of the second vertical rod 26.

The drive unit 50 is mounted on the second vertical rod 26 and disposed at the center of the first top shade member 40, comprising a transmission gear set 52 and meshed with a gear 44 at the first top shade member 40. Thus, the drive unit 50 is operable to rotate the first top shade member 40 on the second vertical rod 26.

The second top shade member 60 is shaped like an umbrella and mounted on the second vertical rod 26 above the top opening 42 of the first top shade member 40. Thus, the space above the first top shade member 40 and the space below the first top shade member 40 are kept open for ventilation; the second top shade member 60 protects the top opening 42 of the first top shade member 40 from the light of the sun. Further, when it is raining, the second top shade member 60 can be lowered on the second vertical rod 26 to cover the top opening 42 of the first top shade member 40. Subject to the movable relationship between the second top shade member 60 and the first top shade member 40, a gap can be adjustably kept the second top shade member 60 and the first top shade member 40 for ventilation, avoiding deformation or displacement of component parts due to concentration of wind pressure under a strong wind condition.

The lateral shade member 70 is an arched Venetian blind, turnable about a pivot rod 71, which is fixedly mounted on the first top shade member 40 in a perpendicular manner relative to the second vertical rod 26, i.e., the pivot rod 71 is perpendicular to the axis of rotation of the first top shade member 40.

The sun tracker 80 is installed in the top center of the lateral shade member 70 and electrically connected to the drive unit 50 through a rotary connection unit 82. The rotary connection unit 82 consists of first member 821 and a second member 822. The first member 821 and the second member 822 are electrically coupled together and rotatable relative to each other. Further, the first member 821 and the second member 822 are sleeved onto the second vertical rod 26, and respectively connected to the first top shade member 40 and the drive unit 50 and also respectively electrically connected to the sun tracker 80 and the drive unit 50. Thus, the sun tracker 80 detects the direction of the light rays of the sun and provides a corresponding signal to the drive unit 50, causing the drive unit 50 to rotate the first top shade member 40 and to move the lateral shade member 70 to the optimal shading position. Because the lateral shade member 70 is an arched Venetian blind, the user can adjust the angle of the slats of the lateral shade member 70 to protect against sunlight and rain without causing too much wind resistance.

Figure 7:
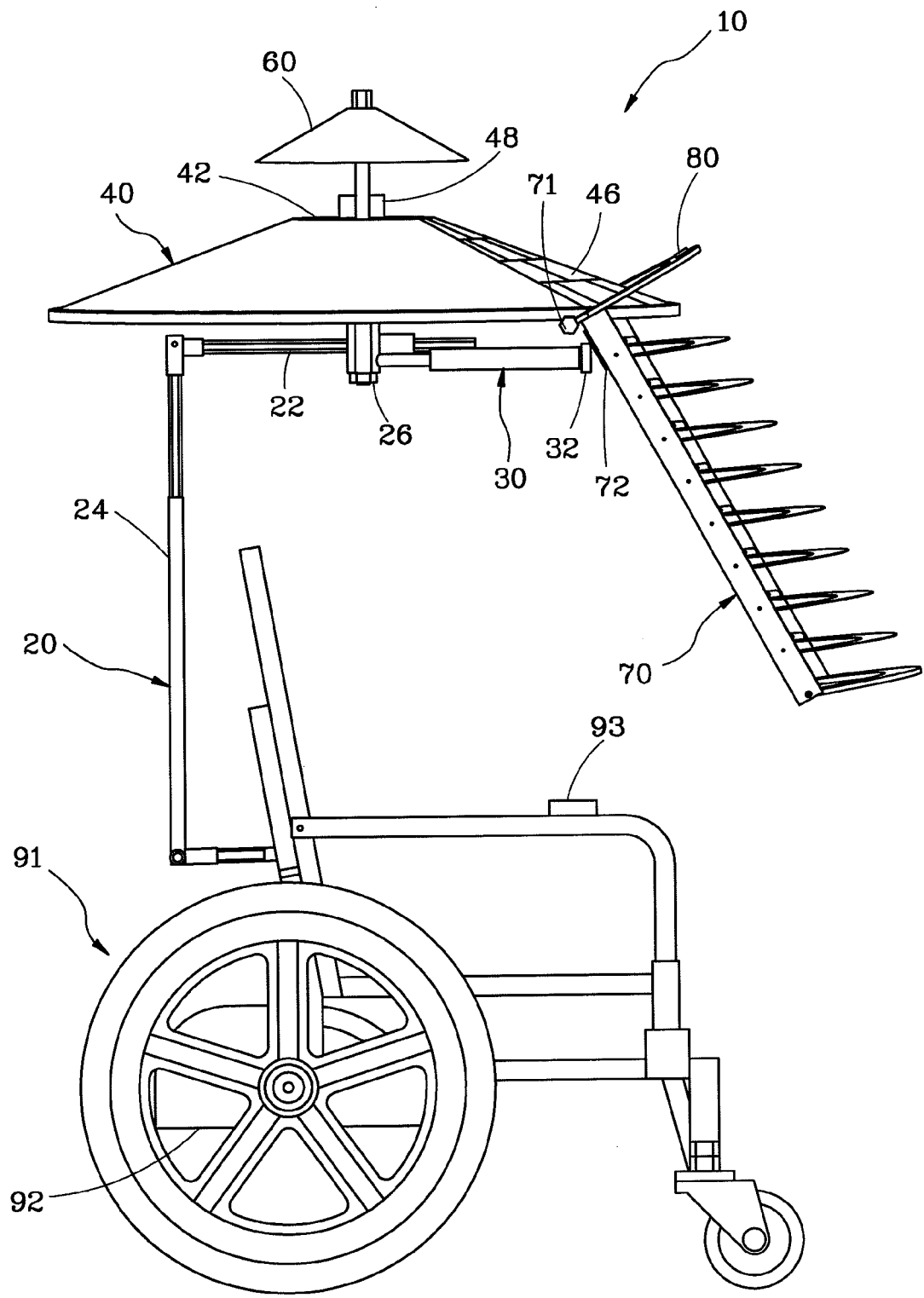
FIG. 7 is a schematic applied view of the present invention, illustrating the sun-tracing sunshade installed in a wheelchair.

Referring to FIG. 7, the sun-tracing sunshade 10 can be installed in a wheelchair 91 to keep the first top shade member 40 right above the user sitting in the wheelchair 91 and the end of the push member 30 that is equipped with the rollers 32 facing toward the front side of the wheelchair 91. When the light of the sun directly falls upon the front side of the user, the lateral shade member 70 will be moved to the front side of the user. At this time, an inner plate 72 of the lateral shade member 70 will be moved into contact with the push member 30, causing the lateral shade member 70 to be turned upwardly outwards. Thus, the user can see through the gap between each two adjacent slats of the lateral shade member 70. Further, the length of the lateral shade member 70 can be so designed that lifting the push member 30 does not interfere with the front side of the user. When the light of the sun passes from any other direction, the lateral shade member 70 will be moved to the direction of the sunlight without touching the push member 30. At this time, the lateral shade member 70 suspends vertically from the first top shade member 40 (see FIG. 4) to effectively keep the user from the light of the sun without interfering with the user's sight.

In the aforesaid application example, the wheelchair 91 is equipped with a power source 92 that provides the necessary working power to the drive unit 50 and the sun tracker 80. Further, solar panels 46 can be mounted on the first top shade member 40 and electrically connected to an electrical storage device 48, which can be electrically connected with the drive unit 50 and the sun tracker 80 to provide them with the necessary working power. The location of the solar panels 46 corresponds to the lateral shade member 70. Thus, the solar panels 46 are synchronously movable with the lateral shade member 70 to the direction of the sunlight, enhancing the energy conversion efficiency. Further, a controller 93 can be mounted on one armrest of the wheelchair 91 for manual operation by the user to control the rotation of the first top shade member 40 when the sun tracker 80 senses no signal, achieving rain shading and shielding effects.

Figure 8:
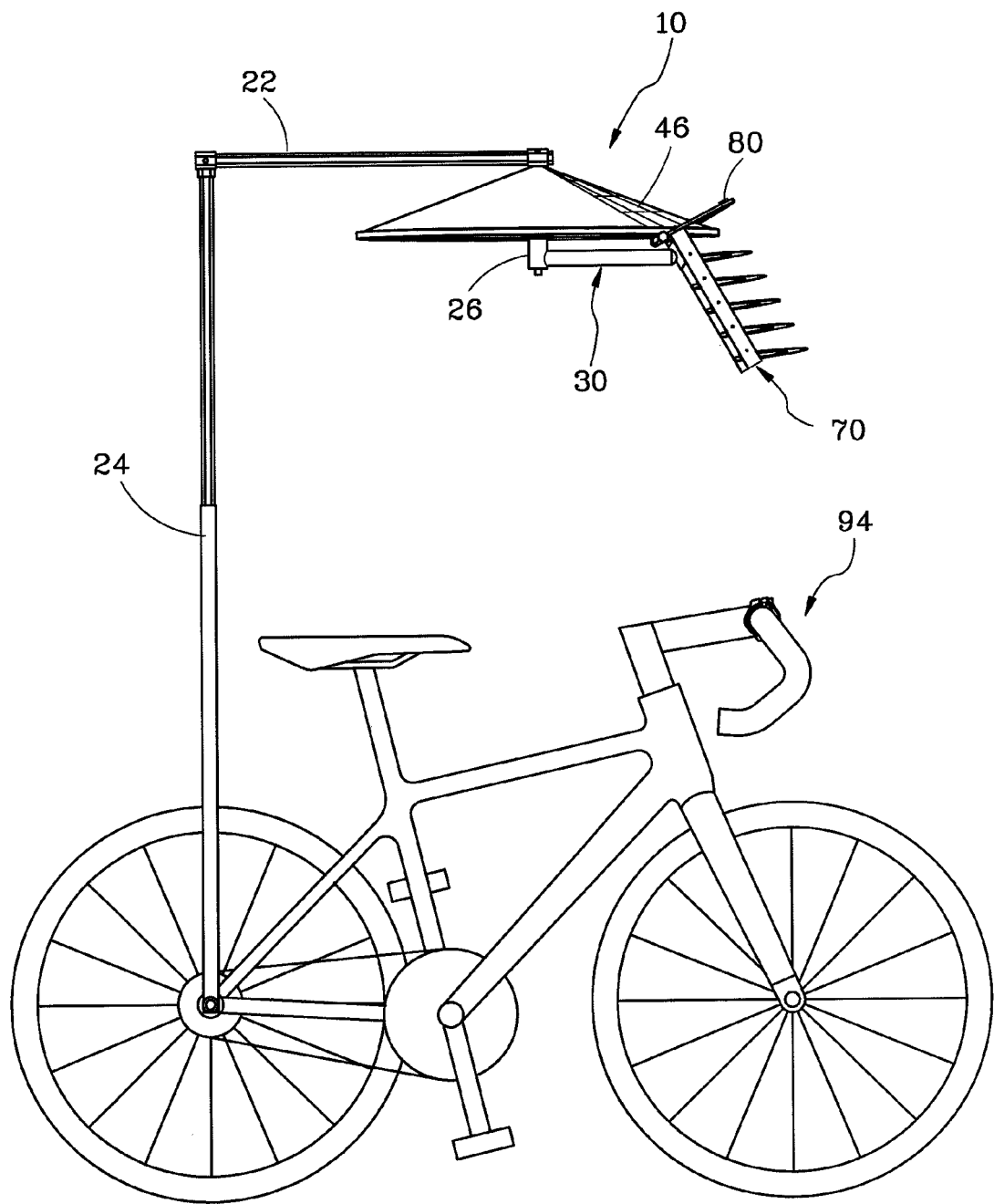
FIG. 8 is another schematic applied view of the present invention, illustrating the sun-tracing sunshade installed in a bicycle.
Figure 9:
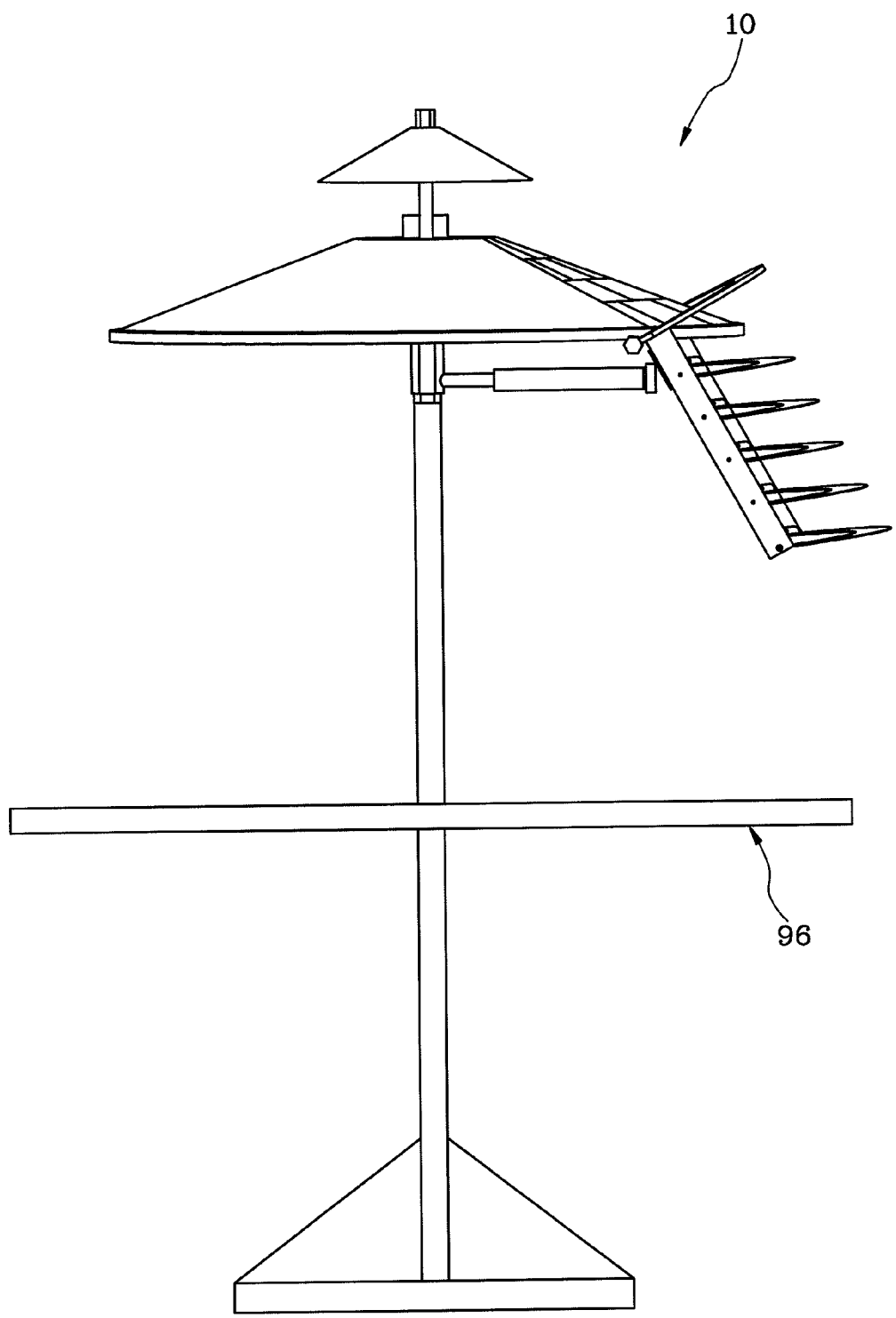
FIG. 9 is still another schematic applied view of the present invention, illustrating the sun-tracing sunshade installed in a leisure table.

As shown in FIG. 8, the sun-tracing sunshade 10 can also be installed in a bicycle 94 or any other vehicle, or, a leisure table 96 as shown in FIG. 9. In the application example shown in FIG. 7, the rollers 32 of the push member 30 are adapted for rolling contact with the inner plate 72 of the lateral shade member 70 to smoothen relative movement between the lateral shade member 70 and the push member 30 after contact. Thus, the push member 30 can be configured to lift the lateral shade member 70 without the rollers 32, enabling the sun-tracing sunshade 10 to provide excellent rain shading and shielding effects.

The main feature of the present invention is the use of the sun tracker 80 to detect the direction of the light of the sun so that the lateral shade member 70 simply shades the user from the light of the sun without shielding other area round the user. Another feature of the present invention is the use of the push member 30 to lift the lateral shade member 70 so that the lateral shade member 70 does not block the user's sight when it is kept in front of the user to effectively protect the user against the light of the sun. Therefore, the support 20 and the lateral shade member 70 are not limited to the configurations in the present preferred embodiment. For example, the lateral shade member 70 can be a flat panel, or any of a variety of other shades having light and shading functions. Further, the sun-tracing sunshade 10 can also be used in a pavilion, seashore or any of a variety of other places or conditions where sun-shading is required.

In conclusion, the invention provides a sun-tracing sunshade that can effectively protect against the light of the sun in any direction after its installation. As the sun-tracing sunshade can automatically traces the direction of the sun, it effectively blocks sunlight without hindering the user's sight, rendering comfort to the user.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sun-tracing sunshade, comprising:
   a support;
   a first top shade member rotatably mounted on said support;
   a lateral shade member pivotally coupled to said first top shade member;
   a drive unit installed in said support and adapted for rotating said first top shade member relative to said support;
   a sun tracker electrically coupled with said drive unit and adapted for sensing the direction of the sun and providing a corresponding signal to said drive unit; and
   a push member mounted on said support and movable to touch said lateral shade member and to further bias said lateral shade member relative to said first top shade member,
   wherein said first top shade member comprises a gear; said drive unit comprises a transmission gear set meshed with said gear of said first top shade member and movable to rotate said first top shade member.

2. The sun-tracing sunshade as claimed in claim 1, wherein said lateral shade member is turnable about a fixed pivot rod on first top shade member, said pivot rod extending in a perpendicular manner relative to the axis of rotation of said first top shade member.

3. The sun-tracing sunshade as claimed in claim 1, wherein said sun tracker is mounted on said lateral shade member.

4. The sun-tracing sunshade as claimed in claim 1, further comprising at least one solar panel mounted on said first top shade member.

5. The sun-tracing sunshade as claimed in claim 4, further comprising an electrical storage device electrically connected with said at least one solar panel.

6. The sun-tracing sunshade as claimed in claim 5, wherein said electrical storage device is electrically connected with said drive unit.

7. The sun-tracing sunshade as claimed in claim 5, wherein said electrical storage device is electrically connected with said sun tracker.

8. The sun-tracing sunshade as claimed in claim 1, further comprising a second top shade member, wherein said first top shade member comprises a top center opening; said second top shade member is disposed above the top center opening of said first top shade member.

9. The sun-tracing sunshade as claimed in claim 8, wherein said second top shade member is vertically movable relative to said first top shade member.

10. The sun-tracing sunshade as claimed in claim 1, wherein said push member has one end thereof connected to said support and an opposite end thereof equipped with at least one roller for rolling contact with said lateral shade member.

\* \* \* \* \*